United States Patent [19]

Hollander

[11] Patent Number: 4,560,481
[45] Date of Patent: Dec. 24, 1985

[54] METHOD OF CONTROLLING IRON INDUCED FOULING IN WATER SYSTEMS

[75] Inventor: Orin Hollander, Langhorne, Pa.

[73] Assignee: Betz Laboratories, Inc., Trevose, Pa.

[21] Appl. No.: 681,054

[22] Filed: Dec. 13, 1984

[51] Int. Cl.$^4$ ............................................. C02F 5/12
[52] U.S. Cl. ...................................... 210/697; 210/701;
252/180; 252/181; 422/16; 422/17; 422/18
[58] Field of Search ................................ 210/698–701;
252/180, 181, 391, 395; 422/16, 17, 18

[56] References Cited

U.S. PATENT DOCUMENTS

| 3,837,803 | 3/1974 | Vogt et al. | |
|---|---|---|---|
| 4,029,577 | 6/1977 | Godlewski et al. | 210/701 |
| 4,387,027 | 6/1983 | May et al. | 210/701 |
| 4,443,340 | 4/1984 | May et al. | 422/17 |
| 4,500,693 | 2/1985 | Takehara et al. | 526/240 |

FOREIGN PATENT DOCUMENTS

| 58-9987 | 1/1983 | Japan | 210/701 |
|---|---|---|---|
| 58-7415 | 1/1983 | Japan | 210/701 |

*Primary Examiner*—Peter Hruskoci
*Attorney, Agent, or Firm*—Alexander D. Ricci; Bruce E. Peacock

[57] ABSTRACT

A method of inhibiting corrosion and controlling deposition in aqueous mediums, such as in cooling water systems, wherein iron containing well water is used as a water make-up source, is disclosed. The method comprises addition of certain water soluble acrylic acid type/allyl hydroxy propyl sulfonate ether copolymers to the desired aqueous medium.

7 Claims, No Drawings

METHOD OF CONTROLLING IRON INDUCED FOULING IN WATER SYSTEMS

FIELD OF THE INVENTION

The present invention pertains to a method of controlling deposition and inhibiting corrosion of metal surfaces in contact with water systems, such as cooling water systems, in those instances where iron based deposition may be a problem. One specifically contemplated environment is a cooling water system wherein iron containing well water is used as a make-up water source for the system.

BACKGROUND OF THE INVENTION

Industrial water systems are commonly chemically treated to minimize corrosion and reduce deposition along those metal surfaces in contact with the aqueous medium. Typical treatment programs include those disclosed in, inter alia, U.S. Pat. No. 3,837,803 (Vogt et al) and U.S. Pat. No. 4,029,577 (Godlewski et al).

One particularly troublesome fouling species is iron based fouling that typically occurs in water systems being supplied with water from an iron containing well water source. One successful approach in treating such conditions has been disclosed in U.S. Pat. No. 4,387,027 (May et al).

Well waters typically exist under reducing conditions. Under such conditions, iron exists primarily as the ferrous ion ($Fe^{+2}$) species. Upon exposure to air, the ferrous ion oxidizes to ferric ion ($Fe^{+3}$). The ferrous ion is typically present as the aquo ion, $Fe(H_2O)_6^{+2}$, while the ferric ion exists as a hydrated oxide, $Fe_2O_3 \cdot nH_2O$. From known solubility data, the $Fe^{+2}$ ion is $10^{15}$ times more soluble at pH 7 than is the $Fe^{+3}$ ion. Accordingly, iron is soluble in well water (as $Fe^{+2}$). Upon exposure to air (as would be encountered when such well water is admitted to a cooling water system), this freshly produced iron species ($Fe^{+3}$) becomes almost completely insoluble and is the root of a most troublesome fouling problem.

In those instances in which water soluble polymers are used in the water system to inhibit corrosion and deposition, such freshly produced iron ($Fe^{+3}$) ion readily promotes coagulation of the polymer. Although the particular mechanism for such coagulation phenomenon is not known for certain, it is thought that the freshly produced $Fe^{+3}$ ion, being small and highly charged, attracts the polymer causing coagulation thereof. This attractive force is exacerbated when anionic polymer electrolytes are used as the water treatment polymer.

In other words, when such freshly produced $Fe^{+3}$ ions enter a water system, the resulting particulate iron oxides have a "fresh" (highly surface active) surface and are thus very active towards adsorption of polymers. In contrast, when iron ions are present in surface waters, they have been deactivated by the previous adsorption of various organic molecules, biopolymers, proteins etc. thereon. The available adsorption sites on these surface water iron ions are already occupied by these organics, and further adsorption is therefore precluded. The present invention is concerned with methods of inhibiting fouling and corrosion caused by the former "freshly produced $Fe^{+3}$ ions".

I have found that the use of certain water soluble copolymers inhibits fouling and corrosion in test water systems under conditions which simulate those experienced when iron containing well water is used as a make-up water source. These water soluble copolymers, which shall be explained in greater detail hereinafter, may be referred to as (meth)acrylic acid type—allyl hydroxy propyl sulfonate ether water soluble copolymers.

These copolymers are not new per se as they have been reported in Japanese Patent Publication 58-9987. Indeed, they have been touted in such publication as being useful scale preventing agents when used in, inter alia, boilers, condensors, heat exchangers etc. and the disclosure also suggests use thereof in cooling water. However, this Japanese publication does not at all suggest that the disclosed polymers could be used in the specific environment herein required and claimed, to wit: use to inhibit corrosion and deposition in water systems having the previously described highly surface active iron ions existing therein.

Of arguably similar, although probably lesser interest, to the present invention is Japanese Patent Publication Sho No. 58-7415. Also mentioned as being of possible interest is Japanese Patent Publication No. 56-155692.

DETAILED DESCRIPTION

I have found that addition of a water soluble copolymer (having the following formula) to a water system, having iron ions similar to those encountered when iron containing well water is used as a make up source, inhibits corrosion of and deposition along those metal surfaces in contact with the system water.

Specifically, the water soluble copolymer comprises repeat unit moieties (a) and (b) wherein the repeat unit moiety (a) comprises the structure:

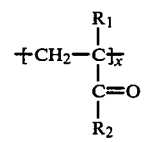

and wherein repeat unit moiety (b) comprises the structure:

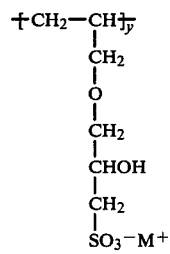

wherein x and y are integers and the ratio of x:y may be in the range of about 30:1 to 1:20, $R_1$ is H or lower alkyl ($C_1$-$C_3$), $R_2$ is OH, OM, or $NH_2$, M is H or a water soluble cation.

The number average molecular weight ($\overline{M}n$) of the copolymer may be between about 1,000 to 1,000,000. The only essential criterion regarding molecular weight is that the copolymer be water soluble. A preferred molecular weight ($\overline{M}n$) is between about 2,000-10,000.

As stated above, the molar ratio x:y of the repeat units may be 30:1 to 1:20, with a molar ratio x:y of 10:1 to 1:5 being even more preferred. At present, the copolymer preferred for commercial usage is a copolymer of acrylic acid (AA)/allyl 2-hydroxypropyl sulfonate ether (AHPSE) wherein the molar ratio AA:AHPSE is 6:1 and the molecular weight (Mn) is between about 2,000-6,500.

As to preparation of the (meth)acrylic acid type monomer (repeat unit a in the above formula), such synthetic preparatory routes are well known and do not need repeating in detail herein. Suffice it here to say that acrylic acid is commonly produced via hydrolysis of acrylonitrile or via oxidation of acrolein. Other well known vinyl containing monomers such as methacrylic acid and acrylamide may also be utilized as repeat unit a in the first formula.

The allyl hydroxy propyl sulfonate ether monomer (AHPSE) (repeat unit b in the above formula) may conveniently be prepared via a ring opening reaction of the epoxy group of an allyl glycidyl ether precursor. Sulfontion of the epoxy group with sodium sulfite in the presence of a phase transfer catalyst such as tetra-n-butylammonium bisulfite or with fuming sulfuric acid containing sulfur trioxide will produce the sulfonic acid group and hydroxy group of the AHPSE. The resulting monomer can be further neutralized with caustic or other basic material. The reaction is illustrated by the following mechanism:

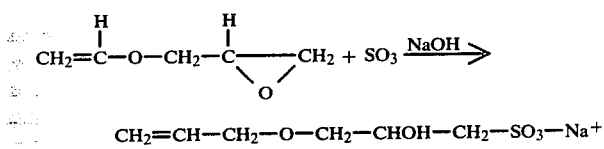

$$CH_2=CH-CH_2-O-CH_2-CHOH-CH_2-SO_3-Na^+$$

After the desired monomers have been obtained, free radical chain addition polymerization may proceed in accordance with conventional solution polymerization techniques. Polymerization initiators such as persulfate initiators, peroxide initiators, etc. may be used. Preferably, the requisite monomers are mixed with water and alcohol (preferably isopropanol). The resulting polymer maybe isolated by well-known methods such as distillation, etc. or the resulting polymer may simply be used in its aqueous solution.

The copolymers should be added to the aqueous system having surface active $Fe^{+3}$ ion fouling problems in an effective amount for the purpose. This amount will vary depending upon the particular system for which treatment is desired and will be influenced by factors such as, the area subject to corrosion, pH, temperature, water quantity and the concentration in the water of the highly surface active $Fe^{+3}$ species. For the most part, the polymers will be effective when used at levels of about 0.1-500 parts per million parts of water, and preferably from about 1.0 to 100 parts million of water contained in the aqueous system to be treated. The polymers may be added directly into the desired water system in a fixed quantity and in the state of aqueous solution either continuously or intermittently. The preferred environment for use is in cooling water systems wherein surface active $Fe^{+3}$ is admitted to the system from a well water source. It is thought that any water system having highly surface active $Fe^{+3}$ ions therein in the range of 0.5 to 10 or greater ppm of such $Fe^{+3}$ will benefit from the invention.

As the recirculator tests reported in the following examples indicate, it is postulated that the water soluble copolymers can be used in systems containing such surface active $Fe^{+3}$ ions in conjunction with a water soluble orthophosphate compound or precursor thereof (i.e., any phosphate reverting to orthophosphate in water) in order to passivate metal surfaces (without substantial deposition thereon) in contact with the system water. In such instances, postulated dosage ranges are:

Orthophosphate($PO_4^{-3}$): 2-50 ppm, preferably 6-30 ppm

Copolymer: 0.3-120 ppm, preferably 3-25 ppm water polyphosphate (if desired): 0.1-30 ppm, preferably 3-10 ppm Other parameters which should be met in order to obtain passivation include maintenance of a pH of 5.5 or greater in the system (preferably 6.5-9.5) and the maintenance of a calcium ion concentration in the system water of about 15 parts per million parts system water. If the calcium ion content is below this range, it maybe necessary for overall effectiveness to add metallic ions such as zinc, nickel, chromium, etc. as described in Col. 3, lines 4-24 of U.S. Pat. No. 3,837,803.

EXAMPLES

The invention will now be further described with reference to the following examples, which are to be regarded solely as illustrative, and not as restricting the scope of the invention.

Polymer Preparation

Polymers in accordance with the invention were prepared as per the specification of pending application Ser. No. 545,563 (of common assignment herewith). Specifically, in each instance of polymer preparation, the following procedure was used. A reaction flask was equipped with a mechanical agitator, a thermometer, a reflux condensor, a nitrogen inlet and two addition inlets for the initiator and monomer solutions. The flask was charged with deionized water and isopropanol. The resulting solution was then heated to reflux under a nitrogen blanket.

The requisite molar amount of acrylic acid and required molar amount of 1-propane sulfonic acid, 2-hydroxy-3-(2-propenyl oxy)mono sodium salt [AHPSE] were mixed together in a separate flask so as to serve as a mixed monomer solution. This mixed monomer solution was then transferred to an addition funnel.

An initiator solution containing sodium persulfate in deionized water was separately prepared and then sparged with nitrogen. The initiator solution was then added to the reaction flask along with the mixed monomer solution over a period of 2 hours. After this addition, the resulting mixture was heated for about 2 more hours at 65° C. and subsequently the isopropanol/water solution was stripped off. The reaction mixture was then cooled and neutralized by caustic addition. Structures of the resulting polymers were verified by carbon 13 NMR.

The following copolymers were prepared in accordance with the above procedure:

| Polymer | Monomer Ratio Acrylic Acid/AHPSE | % Solids | $\overline{Mn}$ | $\overline{Mw}$ | Viscosity (cps) |
|---|---|---|---|---|---|
| A | 6:1 | 25.0 | 2,217 | 6,731 | 15.4 |
| B | 6:1 | 25.0 | 2,770 | 12,200 | 20.5 |
| C | 6:1 | 25.0 | 6,420 | 43,300 | 77.0 |
| D | 6:1 | 25.0 | 3,300 | — | 23.0 |
| E | 6:1 | 25.0 | 2,700 | — | 25.6 |

-continued

| Polymer | Monomer Ratio Acrylic Acid/AHPSE | % Solids | $\overline{M_n}$ | $\overline{M_w}$ | Viscosity (cps) |
|---|---|---|---|---|---|
| F | 6:1 | 25.0 | 3,200 | — | 20.7 |

POLARIZATION STUDIES

In order to produce $Fe^{+3}$ ions similar to the type encountered in real cooling systems using iron containing well water as a make-up source, iron ions were generated by a method referred to as "Potentiodynamic Polarization". The purpose of this method is to electrically perturb a corroding metal electrode from its steady-state potential and to observe the resulting current-potential behavior. Specifically, an electrode of the desired metal—in this case low carbon steel—is placed in a 1 liter, 5 neck flask. The flask is filled with about 850 mL of a 0.1N sodium sulfate solution adjusted to pH 7±0.2. The electrode is wet-ground with emery paper and 600 grit silicon carbide polishing compound, ultrasonically cleaned and degreased in toluene vapor. After the electrode is cleaned, it is inserted into the deaerated solution and allowed to equilibrate. A potentiostat is operatively connected to the electrode. This process is monitored by tracking the electrode potential versus a standard reference electrode (to which the potentiostat is also operatively connected). When the potential is stable to ±2 mV for 1 hour, the experiment is initiated. The potentiostat is set to alter the electrode potential at 10 mV/minute, starting about −600 mV to the equilibrium potential, and continuing to about +400 mV to the equilibrium potential.

In the sweep from −600 mV to 0 mV (relative) the process(es) occurring at the test electrode is (are) primarily:

$$2H^+ + 2e^- \rightarrow H_2 \text{ (at low potentials)}$$

and $$O_2 + 2H_2O + 4e^- \rightarrow 4OH^- \text{ (at higher potentials)}$$

In the sweep from 0 to +400 mV (relative) the primary processes at the electrode are:

$$Fe \rightarrow Fe^{+2} + 2e^- \text{ (at lower potentials)}$$

and $Fe^{+2} \rightarrow +e^- + Fe^{+3}$ (at higher potentials)

This results in the fresh production of $Fe^{+3}$ ions similar to those encountered in cooling water systems wherein iron containing well water is used as a make-up source.

Polymers in accordance with the invention were present in solutions in which $Fe^{+3}$ ions were generated by the process hereinabove described. In tests with other polymers (not covered by the present invention), the iron ions precipitated out as $Fe(OH)_3$ and other iron oxide species. Additionally the other polymers were gelled by the cross linking action of $Fe^{+3}$ ions.

In sharp contrast, when polymers in accordance with the invention were present in solutions in which $Fe^{+3}$ ions were generated by the above polarization technique, the test solution remained clear although the presence of Fe ions was confirmed by the yellow-brown color of the test solutions. No polymer gellation occurred either. The lack of gellation and the solubility of iron ions indicates a good stability of the polymer towards the type of iron species encountered when iron containing well water is used as a make-up water source in cooling water systems.

The iron analysis results gathered pursuant to the "Potentiodynamic Polarization" tests reported hereinbelow in Table I indicate that when the present polymers are used, an extraordinary high level of soluble iron exists in the test solution. Ordinarily, at pH 7 the solubility limit of ferric hydroxide, as iron, is $2.5 \times 10^{-5}$ ppm. As can be seen in Table I, use of the present polymers enhances the solubility of iron at least about one million fold.

TABLE I

Iron Analysis of Supporting Electrolyte After Anodic Polarization of Low Carbon Steel Electrodes:

| Iron[b] Polymer | Conc (ppm) | Total Corrosion Rate[a] (mpy) | Soluble pH | (ppm) |
|---|---|---|---|---|
| A | 100 | 35.8 | 7 | 24.0 |
| B | 100 | 18.6 | 7 | 9.3 |
| C | 100 | 27.6 | 7 | 18.8 |

[a]Sum of values in air and under nitrogen
[b]All iron was soluble. Differences are due to amounts of iron produced by differential corrosion rates.

Recirculator Studies

In order to approximate those conditions experienced in a cooling tower, tests were conducted under recirculatory conditions with heat transfer provided.

These conditions closely simulate the environment in a field cooling system. In this test system, treated water is circulated by a centrifugal pump through a corrosion coupon bypass into which corrosion coupons are inserted, and past a mild steel (AISI-1010) heat exchanger tube contained in a Plexiglas block. The inside of the exchanger tube is filled with silicone oil and heated with an electric heater. The temperature of the silicone oil can be regulated. The water velocity past the corrosion coupons and heat exchanger tube can be controlled anywhere from 0 to 4.5 ft/sec. The pH and temperature of the bulk water are automatically controlled. The treated water is prepared by chemical addition to deionized water. Provisions for continuous make-up and blowdown are made by pumping fresh treated water from supply tanks to the sump; with overflow from the sump serving as blowdown.

Corrosion rates are determined by exposing precleaned and weighed metal specimens for a specified period of time, after which they are removed, cleaned and reweighed. Corrosion rates are calculated by dividing the total coupon weight loss by the number of days exposure.

The conditions used were: Heat Flux 8000 BTU/ft²/hr; Water Velocity=3 ft/sec; Water Temperature=120° F.; Retention Time=1.3 days; Mild Steel Heat Transfer Surface.

Water Chemistry: 500 ppm Ca as $CaCO_3$; 250 ppm $Mg^{+2}$ as $CaCO_3$; 83 ppm $NaHCO_3$; pH=7.3±0.2, $Fe^{+3}$ 5.0 ppm as $Fe^{+3}$*.

*Added from deaerated solution directly to sump to avoid precipitation of $Fe^{+3}$ prior to addition so as to simulate conditions experienced upon use of iron containing well water as a make-up source in real cooling systems.

Results of the recirculator tests are reported in the following tables.

TABLE 2

Comparative Recirculator Test Using 12.5 ppm acrylic acid/2-hydroxypropyl acrylate polymer (molar ratio AA:HPA = 3:1 Mw ≈ 6,000) as test polymer Corrosion Results

| Coupon # | Coupon Type | Corrosion Rate mpy | Exposure Duration (Days) | Appearance (Coupon) |
|---|---|---|---|---|
| G-1 | Low carbon steel | 10 | 1 | Moderate, non-uniform whitish brown deposit |
| G-2 | Low carbon steel | 3.8 | 4 | Same as G-1 but more severe |
| G-3 | Low carbon steel | 3.0 | 3 | Very thin deposit with spots of localized corrosion |
| G-4 | Admiralty | 1.0 | 1 | Clean with water spotting |
| G-5 | Admiralty | 0.5 | 4 | Clean with water spotting |
| G-6 | Admiralty | 0.7 | 3 | Clean with water spotting |
| 121 | Pretreated low carbon steel | 4.0 | 1 | Clean |
| 122 | Pretreated low carbon steel | 2.3 | 4 | Clean |
| 137 | Pretreated low carbon steel | 2.7 | 3 | Clean | heat transfer surface appearance - pretreated = localized areas of non-uniform deposit and corrosion, otherwise clean; non pretreated = scattered pits with large patch of thin yellowish deposit.

Recirculator Water Analysis

| (Time) day | ppm soluble orthophosphate retained in recirculating water | total iron retained in recirculating water |
|---|---|---|
| 1 | 9.0 | 4.0 |
| 2 | 8.2 | 1.5 |
|   | 7.9 |   |
| 3 | 8.6 | 1.5 |
| 4 | 9.6 | 1.3 |
| 5 | 9.6 | 2.0 |

TABLE 3

Recirculator test using 12.5 ppm acrylic acid/AHPSE polymer*

Corrosion Results

| Coupon # | Coupon Type | Corrosion Rate mpy | Exposure Duration (Days) | Appearance (Coupon) |
|---|---|---|---|---|
| C-1 | Low carbon steel | 9.0 | 1 | Tan Deposit over 90% surface |
| C-2 | Low carbon steel | 3.0 | 4 | Tan Deposit over 80% surface, non-uniform |
| C-3 | Low carbon steel | 3.3 | 3 | Scattered pits with corrosion induced fouling |
| C-4 | admiralty | 2.0 | 1 | Clean with water spotting |
| C-5 | admiralty | 0.8 | 4 | Clean with water spotting |
| C-6 | admiralty | 0.7 | 3 | Clean with water spotting |
| 123 | pretreated low carbon steel | 4.0 | 1 | Clean |
| 124 | Pretreated low carbon steel | 1.8 | 4 | Clean |
| 140 | Pretreated low carbon steel | 2.0 | 3 | Clean | heat transfer surface appearance - pretreated = isolated, localized corrosion, clean, non-pretreated = scattered pitting and localized areas of corrosion/corrosion induced fouling.

Recirculator Water Analysis

| (Time) day | ppm soluble orthophosphate retained in recirculating water | total iron retained in recirculating water |
|---|---|---|
| 1 | 9.8 | 4.0 |
| 2 | 13.6 | 1.5 |
|   | 8.5 |   |
| 3 | 8.8 | 5.5 |
| 4 | 10.8 | 5.0 |
| 5 | 12.2 | 5.0 |

*(equal weight mixture of polymers D, E, and F)

Discussion Recirculator Tests Results

The recirculator test data and coupon appearance demonstrate the unique ability of the AA/AHPSE co-polymers (Table 3) in controlling iron fouling as compared to the acrylic acid/2-hydroxy propyl acrylate (AA/HPA) copolymers (Table 2). Of particular note is the fact that the total iron levels in the recirculating water closely parallel the iron feedrate in the AA-/AHPSE test (Table 3) whereas with the AA/HPA copolymers (Table 2) a significant loss of nearly 75% of the simulated well water iron is experienced. This difference represents precipitated iron (i.e. that iron which would adhere to metallurgy in contact with the cooling water system). Accordingly, it is thought that the AA-/AHPSE copolymers will be efficacious in controlling iron deposition in cooling water systems wherein iron has been admitted to the system from a well water source.

Also noteworthy is the fact that consistently higher levels of soluble orthophosphate are retained in the AA/AHPSE treated system (Table 3) than in the AA/HPA treated system (Table 2). This fact indicates that the AA/AHPSE copolymers may be successfully utilized in conjunction with orthophosphate based corrosion inhibitors to form the highly desired, but elusive passivated film on system metallurgy. Presently, high levels (preferred ≈6 to 30 ppm) of orthophosphate are employed in conjunction with calcium phosphate dispersants so as to result in the formation of such passivated film along the metallurgical surfaces of the cooling system. The AA/AHPSE copolymers may be successfully applied to the system, in addition to such high orthophosphate dosage, even in those instances wherein $Fe^{+3}$, from a well water source, is contained within the system.

In can thus be seen that the disclosed invention carries out the objects of the invention set forth above. In accord with the patent statutes, the best mode has been set forth. However, it will be apparent to those skilled in the art that many modifications can be made without departing from he invention herein disclosed and described, the scope of the invention being limited solely by the scope of the attached claims.

I claim:

1. A method of inhibiting corrosion and controlling deposition in a cooling water system of the type comprising iron species present in said cooling water in a deposit forming amount and under deposit forming conditions, wherein surface active $Fe^{+3}$ ions are admitted to said cooling water, said method comprising adding to said cooling water an effective amount of a water soluble copolymer comprising repeat unit moieties (a) and (b) wherein said repeat unit moiety (a) comprises the structure:

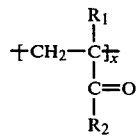

and wherein said repeat unit (b) comprises the structure:

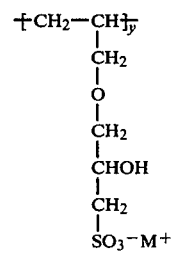

wherein x and y are integers and the ratio of x:y is in the range of about 10:1 to 1:5, $R_1$ is H or lower alkyl ($C_1$-$C_3$), $R_2$ is OH, OM, or $NH_2$, M is H or a water soluble cation.

2. A method as recited in claim 1 wherein said iron species are admitted to said cooling water system from a well water makeup source.

3. A method as recited in claim 1 wherein the number average molecular weight ($\overline{Mn}$) of said copolymer is between about 1,000 to 1,000,000.

4. A method as recited in claim 3 wherein said number average molecular weight ($\overline{Mn}$) of said copolymer is between about 2,000–10,000.

5. A method as recited in claim 1 wherein said water soluble copolymer is added to said aqueous medium in an amount of about 0.1–500 parts polymer based upon 1 million parts of said aqueous medium.

6. A method as recited in claim 1 wherein said repeat unit (a) comprises acrylic acid or water soluble salt form thereof.

7. A method as recited in claim 1 further comprising, adding to said aqueous medium, between about 6 to 30 parts per million, based upon one million parts of said aqueous medium, of a water soluble orthophosphate compound, said copolymer and said orthophosphate compound resulting in the formation of a passivated film along metallic surfaces in contact with said aqueous medium without resulting in substantial deposition thereon.

* * * * *